United States Patent [19]

Godlewski et al.

[11] 4,288,327
[45] Sep. 8, 1981

[54] COPOLYMERS FOR THE CONTROL OF THE FORMATION AND DEPOSITION OF MATERIALS IN AQUEOUS MEDIUMS

[75] Inventors: Irene T. Godlewski, Cinnaminson, N.J.; Joseph J. Schuck, Holland; Andrew S. Chisarik, Cornwells Heights, both of Pa.

[73] Assignee: Betz Laboratories, Inc., Trevose, Pa.

[21] Appl. No.: 4,646

[22] Filed: Jan. 19, 1979

Related U.S. Application Data

[63] Continuation-in-part of Ser. No. 689,755, May 25, 1976, abandoned, which is a continuation-in-part of Ser. No. 610,952, Sep. 8, 1975, abandoned.

[51] Int. Cl.³ .............................................. C02F 5/10
[52] U.S. Cl. .................................................. 210/698
[58] Field of Search ............... 210/696, 697, 698, 699, 210/700, 701; 252/82, 175, 180, DIG. 2, DIG. 11

[56] References Cited

U.S. PATENT DOCUMENTS

| | | | |
|---|---|---|---|
| 2,723,956 | 11/1955 | Johnson | 252/80 |
| 3,188,289 | 6/1965 | Kahler | 210/698 |
| 3,276,998 | 10/1966 | Green | 210/732 |
| 3,289,734 | 12/1966 | Robertson | 159/407 WL |
| 3,549,538 | 12/1970 | Jacklin | 210/698 |
| 3,629,105 | 12/1971 | Weis | 210/698 |
| 3,630,937 | 12/1971 | Baum | 210/698 |
| 3,650,970 | 3/1972 | Pratt | 210/698 |
| 3,650,970 | 3/1972 | Pratt | 210/698 |
| 3,696,043 | 10/1972 | Labarge | 252/DIG. 2 |
| 3,715,307 | 2/1973 | Johnson | 252/180 |
| 3,793,228 | 2/1974 | Kandler | 252/DIG. 2 |
| 3,810,834 | 5/1974 | Jones | 210/698 |
| 4,001,134 | 1/1977 | Markofsky | 210/698 |
| 4,048,066 | 9/1977 | Cuisia | 210/701 |

*Primary Examiner*—Ernest G. Therkorn
*Attorney, Agent, or Firm*—Alexander D. Ricci

[57] ABSTRACT

The present invention relates to processes for controlling the formation and deposition of scale and sludge and in particular calcium phosphate which would otherwise occur in aqueous mediums containing sludge and the ions capable of forming scale. The invention, more particularly, relates to the control, reduction and/or prevention of scale and sludge deposits in cooling water, scrubber and steam generating systems, evaporators, economizers, and the like by the introduction of a copolymer comprising sulfonated styrene and maleic anhydride moieties to the water used therein. The copolymers discovered to be particularly effective for the purpose are those having a mole ratio of sulfonated styrene moieties to moieties derived from maleic anhydride of from about 2:1 to about 4:1 and preferably 2:1 to 3:1 with certain type deposits.

59 Claims, No Drawings

COPOLYMERS FOR THE CONTROL OF THE FORMATION AND DEPOSITION OF MATERIALS IN AQUEOUS MEDIUMS

This application is a continuation-in-part of Ser. No. 689,755 filed May 25, 1976, which in turn is a continuation-in-part of application Ser. No. 610,952 filed Sept. 8, 1975, both now abandoned, the disclosures of said two aforementioned applications being incorporated herein in their entirety.

BACKGROUND OF THE INVENTION

Although the invention has general applicability to any given system where the formation and deposition of scale and in particular calcium phosphate is a potential problem, the invention will be discussed in detail as it concerns boiler water systems.

As is well known and comprehensively described and discussed in the *Betz Handbook of Industrial Water Conditioning*, 6th Edition, 1968, Betz Laboratories, Inc., Trevose, Pennsylvania, pages 151–171, the formation of scale and sludge deposits on boiler heating surfaces is the most serious water problem encountered in steam generation. Although current industrial steam producing systems make use of sophisticated external treatments of the boiler feedwater, e.g., coagulation, filtration, softening of water prior to its feed into the boiler system, those operations are only moderately effective. In all cases, external treatment does not in itself provide adequate treatment since muds, sludge, clay, silts, iron oxides and hardness-imparting ions, e.g., calcium, magnesium, and carbonate ions, escape the treatment and eventually are introduced into the steam generating system.

The problems which result from their introduction into the steam generating system are apparent. Since the deposit forming materials are present, they have a tendency to accumulate upon concentration of the water and to settle at points in the system where there is low flow thus restricting water circulation. The baking of mud and/or sludge on tubes and sheets will result in overheating and failure, thereby requiring down time for repair or replacement of the structural parts. In addition, mud, sludge, and silts may become incorporated in scale deposits, adding to their volume and heat insulating effect.

Accordingly, internal treatments have been necessary to maintain the mud and silts in a suspended state. These internal treatments have been generally referred to in the industry as sludge conditioning agents.

In addition to the problems caused by mud, sludge, or silts, the industry has also had to contend with boiler scale. Although external treatment is utilized specifically in an attempt to remove calcium and magnesium from the feed water, scale formation due to residual hardness, e.g., calcium and magnesium salts, is normally experienced. Accordingly, internal treatment, i.e., treatment of the water fed to the system, is necessary to prevent, reduce and/or retard formation of the scale-imparting compounds and their deposition. The carbonates of magnesium and calcium are not the only problem compounds as regards scale. Waters having high contents of phosphate, sulfate and silicate ions, occurring naturally or added for other purposes, are also problematic since calcium and magnesium, and any iron or copper present can react with each and form the respective complex insoluble salts, depositing as boiler scale. The problem is compounded by the deposition of iron oxides and clay with the other scale salts. Iron oxides enter the systems by escaping the pretreatment procedures and/or are present due to corrosion of the metal parts in contact with the aqueous medium. As is obvious, the deposition of scale, which by the present definition includes iron oxide, on the structural parts of a steam generating system causes poorer circulation and lower heat transfer capacity, resulting in an overall loss in efficiency.

Although the foregoing is directed to boiler water systems, or more specifically steam generating systems, the same problems occur in pulp and paper mill systems, cooling water systems, desalination systems (calcium sulfate formation and deposition), scrubber systems and the like. The problems encountered in these operations sometimes are more severe since complete external water treatments are not commonly utilized. Any aqueous system having calcium and magnesium cations and the exemplified anions, in particular phosphate and silicate, will experience the formation and deposition of the scaling salts.

Because of the foregoing, the water treatment industry is constantly evaluating new processes, new products, new techniques in an effort to permit the various process water systems to operate more effectively for longer periods and at lower costs.

Many and different type materials have been used for internal treatment of water systems, and in particular as sludge conditioning agents. Of the vast number may be mentioned alginates, lignins, lignosulfonates, tannins, cellulosic materials, synthetic polymers such as polyacrylates and in particular polymethacrylates, U.S. Pat. Nos. 2,723,956; 3,188,289; 3,549,538 are merely representative of the type materials used and the functions thereof. U.S. Pat. Nos. 2,723,956 and 3,549,538 disclose boiler treatments utilizing maleic anhydride and non-sulfonated styrene copolymers wherein the mole ratio of anhydride to styrene has an excess of anhydride and is at least 1:1 and preferably 2:1.

GENERAL DESCRIPTION OF THE INVENTION

The inventors discovered that if a particular type copolymer composed of essentially sulfonated styrene moieties and those derived from maleic anhydride was added or introduced into the water of a process water system, the formation and deposition of scale, particularly those containing calcium and magnesium phosphate, silicates, and iron oxide, on the metallic structures of the equipment could be controlled to a degree necessary to permit the continual and economical operation of the system.

The polymers which are the subject of the present invention are those containing essentially sulfonated styrene moieties, i.e.,

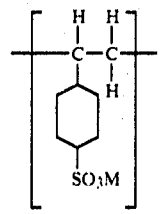

and moieties derived from maleic anhydride, i.e.,

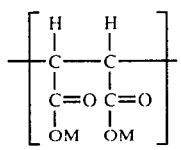

where the sulfonated styrene moieties exceed the moieties derived from the maleic anhydride.

Preferably the copolymers contain a mole ratio of styrene moieties to maleic anhydride derived moieties of from about 2:1 to about 4:1 and preferably about 2:1 to about 3:1, and possess a molecular weight of from 500 to 100,000, although molecular weight is not critical so long as the polymer is water-soluble. The copolymers have been found to be effective when used at levels of from about 0.5 to 100 parts per million of water and preferably from about 2.5 to 25 parts per million parts of water contained in the particular system being treated, for example the steam generating system.

The polymers of the present invention can be produced in different ways; however, their manner of production does not affect in any way their effectiveness as calcium and magnesium phosphate and silicate scale control agents.

One procedure for producing the polymers is to copolymerize styrene with maleic anhydride in the specified ratios. After the polymer is resolubilized by producing the various water-soluble salts (alkali metal), the polymer is then sulfonated in accordance with well-known techniques (note for example U.S. Pat. No. 2,764,576). The degree of sulfonation can vary but substantially complete sulfonation of the styrene moieties is preferred.

Conversion of the polymers into the water soluble metal salts such as the alkali metal salt forms is accomplished by normal methods. Therefore M may represent any one of or a mixture of $NH_4$, H, Na, K, etc.

As is apparent, the other manner of producing the polymers is to first sulfonate the styrene monomer utilizing a technique such as described in the aforecited patent and then copolymerize the resulting sulfonated styrene with the maleic anhydride.

The methods and parameters of copolymerizing the two monomers are well known and illustrated by U.S. Pat. No. 2,723,956. Generally the copolymerization may be effected at temperatures from about 80° to 120° C. utilizing peroxide catalysts such as cumene hydroperoxide, benzyl peroxide, etc. in an inert medium.

The copolymers of the instant invention, which are quite different from the polymers of the cited patents, are very soluble in water which permits the obtention of greater protection against the potential depositions as described earlier.

Commercial polymers suitable for the instant purpose are available from National Starch under the designations Versa TL-3 (formerly marketed as NSPD-2509-50) and NSPD-2727-18.

Specific Embodiments—Steam Generation

The copolymers of the invention were subjected to steam generating conditions utilizing experimental boiler systems having an electrical heat source. The boilers are equipped with a system permitting circulation of water in a path via natural convection. Two probes are installed in the described path positioned vertically one above the other. These probes permit measurement of deposition, if any, at two different locations in the path through which the water circulated. These probes are referred to in the following Tables as the Upper and Lower probes.

The tests conducted using the experimental boilers were operated under the conditions specified in the Tables which follow. The respective tests were designed to establish the effects, if any, of variations found in the different steam generating operations.

During operation of the boilers, pressure and heat probe amperage were continually monitored and the blowdown volumes and steam generation rates were measured.

After test completion, the heat transfer probes were removed and visual observations were recorded as to deposit color, quantity, and quality. Chemical analyses were employed to determine total deposit quantity. In certain instances, the deposit was dissolved in hydrochloric acid and hydrofluoric acid and the solution was analyzed for insolubles, iron, calcium, magnesium, phosphate and silica. Deposit weight was calculated from the solution composition and these results have been reported in the Tables which follow.

In order to establish the scope of the invention, polymers having a 1:1 mole ratio of sulfonated styrene to maleic anhydride were also tested. It was felt that the comparative results provided the necessary evidence to establish the true parameters of the invention.

TABLE I

| | Boiler Evaluation of Sulfonated Styrene Maleic Anhydrides | | | | | | |
|---|---|---|---|---|---|---|---|
| | Ratio Sulfonated Styrene | Treatment Conc. | Boiler Balance (ppm) | | Deposit (g/ft$^2$) | | |
| Treatment | Maleic Anhydride Moieties | (ppm) | P Alk | RSiO$_2$ | Upper | Lower | Total |
| A. Effect of Boiler Balances | | | | | | | |
| 1. Copolymer A | 3:1 | 10 | 184 | 26 | 0.40 | 0.51 | 0.91 |
| 2. Copolymer A | 3:1 | 10 | 230 | 50 | 0.11 | 0.17 | 0.28 |
| 3. Copolymer A | 3:1 | 10 | 242 | 54 | 0.20 | 0.21 | 0.41 |
| 4. Copolymer A | 3:1 | 10 | 440 | 49 | 0.40 | 0.30 | 0.70 |
| B. Effect of Dosage | | | | | | | |
| 1. Copolymer A | 3:1 | 2.5 | 182 | 16 | 3.38 | 3.61 | 6.99 |
| 2. Copolymer A | 3:1 | 3 | 216 | 21 | 0.51 | 1.07 | 1.58 |
| 3. Copolymer A | 3:1 | 5 | 186 | 18 | 0.42 | 0.56 | 0.98 |
| 4. Copolymer A | 3:1 | 5 | 184 | 19 | 0.38 | 0.45 | 0.83 |
| 5. Copolymer A | 3:1 | 10 | 184 | 26 | 0.40 | 0.51 | 0.91 |
| 6. Polymethacrylate Polymer | | 5 | 176 | 19 | 2.50 | 4.61 | 7.11 |
| 7. (Commercial Product) | | 10 | 190 | 25 | 0.38 | 0.77 | 1.15 |
| C. Comparison of Different Monomer Ratios at Different Dosage Levels | | | | | | | |
| 1. Copolymer C | 1:1 | 10 | 194 | 17 | 0.26 | 1.29 | 1.55 |
| 2. Copolymer B | 2:1 | 10 | 170 | 23 | 0.41 | 0.50 | 0.91 |
| 3. Copolymer A | 3:1 | 10 | 184 | 26 | 0.40 | 0.51 | 0.91 |

TABLE I-continued

Boiler Evaluation of Sulfonated Styrene Maleic Anhydrides

| Treatment | Ratio Sulfonated Styrene Maleic Anhydride Moieties | Treatment Conc. (ppm) | Boiler Balance (ppm) P Alk | RSiO₂ | Deposit (g/ft²) Upper | Lower | Total |
|---|---|---|---|---|---|---|---|
| 4. Copolymer C | 1:1 | 5 | 194 | 18 | 0.68 | 3.00 | 3.68 |
| 5. Copolymer B | 2:1 | 5 | 188 | 19 | 0.60 | 2.27 | 2.86 |
| 6. Copolymer A | 3:1 | 5 | 186 | 18 | 0.42 | 0.56 | 0.98 |

Test Conditions: Boiler: No. 2
Pressure: 300 psig
Heat Flux: 185,000 BTU/ft²/hr
Boiler Balances: as noted
Treatment concentration: as noted
Residual Phosphate: 20 ppm
Steam Rate: 8 lbs/hour
Feedwater Hardness: 15 ppm as CaCO₃ (10 ppm Ca/5 ppm Mg)
Molecular Weight - Copolymers A, B, C - approx. 4,000

It is evident from the data recorded in the foregoing Table that the copolymers containing less than 2 moles of sulfonated styrene moieties per mole of maleic anhydride moieties were less effective while those having 2 or more were quite effective.

Additional comparisons were conducted utilizing various specific tests, the results of which are recorded in Table I.

In Table IA which follows are recorded specific data derived from a comparison of Copolymer A used at 10 ppm (Item 5 under Table I, Section B) with a Control, i.e., no treatment. The test conditions and boiler balances were those as specified in Table I, Section B, Item 5. The scale was analyzed to establish the effect that treatment had on scale composition.

TABLE IA

| Scale Component | Deposit (g/ft²) Control | Deposit (g/ft²) Copolymer A 10 ppm | % Scale Reduction on High Heat Transfer Area |
|---|---|---|---|
| Ca | 3.69 | 0.06 | 98 |
| PO₄ | 5.33 | 0.10 | 98 |
| MgO | 1.49 | 0.08 | 95 |
| SiO₂ | 0.26 | 0.06 | 77 |
| Insolubles* | 4.08 | 0.61 | 85 |
| Total | 14.85 | 0.91 | 94 |

*Insolubles are composed of magnesium silicate and iron oxide

In Table IB which follows, the results of a deposit comparison are recorded utilizing a Control, the Commercial Polymethacrylate (Item 6, Table I, Section B) and Copolymer A (Item 3, Table I, Section B). The conditions were those as specified in Table I in the respective Section under boiler balances with the Control being conducted at comparable boiler balances.

TABLE IB

| Scale Component | Deposit (g/ft²) Control | Comm. PMA | Copolymer A | % Scale Reduction PMA | Copolymer A |
|---|---|---|---|---|---|
| Ca | 3.69 | 1.76 | 0.06 | 52 | 98 |
| PO₄ | 5.33 | 3.08 | 0.12 | 42 | 98 |
| MgO | 1.49 | 0.87 | 0.07 | 42 | 95 |
| SiO₂ | 0.26 | 0.36 | 0.02 | — | 92 |
| Insolubles | 4.08 | 1.04 | 0.71 | 75 | 83 |
| Total | 14.85 | 7.11 | 0.98 | 52 | 93 |

Table IC records data relative to a comparison of Copolymer B (2:1 ratio) and Copolymer A (3:1 ratio) with each other in the conditions specified (Items 5 and 6 respectively in Table I, Section C) and with a Control. The results not only establish the effectiveness of the polymer of the invention but also the relative superiority of the 3:1 ratio polymer to the 2:1 polymer.

Table II records the data established during testing to determine the effect if any of heat flux at pressures of 300 psi and 900 psi. In addition to testing a 3:1 polymer in accordance with the present invention, a commercially used polymer was tested at 900 psi to establish a practical comparison.

TABLE IC

| Scale Component | Deposit (g/ft²) Control | Copolymer B | Copolymer A | % Scale Reduction Copolymer B | Copolymer A |
|---|---|---|---|---|---|
| Ca | 3.69 | 0.42 | 0.06 | 89 | 98 |
| PO₄ | 5.33 | 0.88 | 0.12 | 83 | 98 |
| MgO | 1.49 | 0.23 | 0.07 | 85 | 95 |
| SiO₂ | 0.26 | 0.15 | 0.02 | 42 | 92 |
| Insolubles | 4.08 | 1.18 | 0.71 | 71 | 83 |
| Total | 14.85 | 2.86 | 0.98 | 81 | 93 |

TABLE II

Boiler Evaluation of Sulfonated Styrene Maleic Anhydrides

| Treatment | Ratio Sulfonated Styrene Maleic Anhydride Moieties | Treatment Conc. (ppm) | Heat Flux BTU/ft²/hr | Boiler Balance (ppm) P Alk | RSiO₂ | Deposit (g/ft²) Upper | Lower | Total |
|---|---|---|---|---|---|---|---|---|
| A. The Effect of Heat Flux at 300 psig | | | | | | | | |
| 1. Copolymer A | 3:1 | 10 | 185,000 | 224 | 19 | 0.29 | 0.31 | 0.60 |
| 2. Copolymer A | 3:1 | 10 | 240,000 | 234 | 19 | 0.47 | 0.40 | 0.87 |
| 3. Copolymer A | 3:1 | 10 | 300,000 | 220 | 18 | 0.34 | 0.41 | 0.75 |
| 4. Copolymer A | 3:1 | 5 | 300,000 | 203 | 17 | 0.45 | 0.33 | 0.78 |
| B. The Effect of Heat Flux at 900 psig | | | | | | | | |
| 1. Copolymer A | 3:1 | 10 | 185,000 | 221 | 32 | 0.17 | 0.28 | 0.45 |
| 2. Copolymer A | 3:1 | 10 | 240,000 | 198 | 31 | 0.38 | 0.32 | 0.70 |
| 3. Copolymer A | 3:1 | 5 | 300,000 | 205 | 28 | 0.88 | 0.85 | 1.73 |
| 4. Polymethacrylate polymer | | 10 | 185,000 | 222 | 24 | 0.98 | 1.08 | 2.06 |
| 5. (Commercial Product) | | 10 | 300,000 | 210 | 19 | 2.81 | 2.42 | 5.23 |

Test Conditions: Boiler: No. 5
Pressure: as noted
Heat flux: as noted
Feedwater Hardness: 15 ppm as Ca CO₃ (10 ppm Ca/5 ppm Mg)
Boiler Balances: as noted
Residual Phosphate: 20 ppm
Treatment Concentration: as noted
Steam Rate: 300 psig - 8 lbs/hr
900 psig - 16 lbs/hr TABLE II-continued

Boiler Evaluation of Sulfonated Styrene Maleic Anhydrides

| Treatment | Ratio Sulfonated Styrene Maleic Anhydride Moieties | Treatment Conc. (ppm) | Heat Flux BTU/ft²/hr | Boiler Balance (ppm) P Alk | RSiO₂ | Deposit (g/ft²) Upper | Lower | Total |
|---|---|---|---|---|---|---|---|---|

Molecular Weight of Copolymer A is about 4,000

It is apparent from the testing and the data recorded in the foregoing Tables that the prescribed copolymers which are the subject of this invention performed quite impressively. This is particularly evident from the comparative results obtained with respect to the commercial product which has been and in some instances is currently being used for deposit control in steam generating systems.

As in Tables IA through IC, Table IIA contains data recorded relative to specific comparisons of the copolymer of the present invention with the Control and PMA commercial grade. The conditions for the respective tests were those set forth in Table II, Section B, Items 1 and 4, with the Control being conducted at comparable conditions. Even at increased pressures, the instant polymers are significantly more effective than the PMA.

TABLE IIA

| Scale Component | Deposit (g/ft²) | | | % Scale Reduction | |
|---|---|---|---|---|---|
| | Control | Comm. PMA | Copolymer A | PMA | Copolymer A |
| Ca | 1.93 | 0.40 | 0.03 | 79 | 98 |
| PO₄ | 2.89 | 0.71 | 0.07 | 75 | 98 |
| MgO | 0.36 | 0.21 | 0.06 | 42 | 83 |
| SiO₂ | 0.08 | 0.10 | 0.07 | — | 12 |
| Insolubles | 0.60 | 0.64 | 0.22 | — | 63 |
| Total | 5.86 | 2.06 | 0.45 | 65 | 93 |

Specific Embodiments—General Aqueous Systems

In order to establish that the present invention provided overall effectiveness, two different evaluations were conducted which assimilated water conditions found in cooling water systems where the concentration of calcium ions and phosphate ions are such as to provide a calcium phosphate scale prone system.

The evaluations were conducted utilizing solutions containing respectively calcium ion and ortho-phosphate ion. After mixing the two solutions and after the specified equilibration time, residual phosphate ion measurements were made after the mixture had been filtered. High residual phosphate ion concentration indicated good inhibition.

The specifics of the test procedure are as follows:
Conditions:
  Temperature = 70° C.
  pH = 8.5
  Equilibrium Time = 17 hours
  $CaCO_3$ = 250 ppm
  $PO_4^{-3}$ = 6 ppm
  Treatment = 10 ppm
Chemicals:
  (A) 0.4482 g $Na_2H\ PO_4$/liter DI $H_2O$
  (B) 36.76 g $CaCl_2.2H_2O$/liter DI $H_2O$
Procedure:
1. To 1800 ml DI water, add 20 ml solutions (B) followed by 2 drops concentrated HCl
2. Add 40 ml solution (A)
3. Bring volume to 2000 ml with DI water
4. Place 100 ml aliquot of solution (3) in 4 oz. glass bottle
5. Add 1 ml of 0.1% treatment solution and adjust pH to 8.5 using NaOH
6. Place bottle in water bath set to 70° C. and allow to equilibrate 17 hours
7. Remove sample and filter through 0.2 micron filter (hot)
8. Cool to room temperature. To 5 mls filtrate, add 10 mls molybdate reagent, 1 dipper of stannous reagent. Swirl 1 minute, pour into Leitz unit (1 minute for %T (transmission) reading from Leitz) and take %T using Leitz Photometer.

From a standard concentration/transmission curve (copy in file of parent application SN 689,755 and incorporated by reference herein), the following calculation is used to determine percentage inhibition.

$$\% \text{ Inhibition} = \frac{\text{ppm } PO_4 \text{ treated} - \text{ppm } PO_4 \text{ control}}{\text{ppm } PO_4 \text{ stock solution} - \text{ppm } PO_4 \text{ control}} \times 100$$

TABLE II

| Treatment | Ratio Sulfonated Styrene-Maleic Anhydride Moieties | Dosage ppm | Residual Phosphate Concentration (ppm $PO_4^{-3}$) |
|---|---|---|---|
| Control | — | 0 | 0 |
| Copolymer A* | 3:1 | 5 | 4.0 |
| Copolymer A* | 3:1 | 10 | 5.9 |

*Molecular Weight about 4,000

The effectiveness, as indicated in Table III, of the polymer of the invention was apparent. Without treatment all phosphate precipitated while almost 100% inhibition was obtained when 10 ppm of treatment was utilized.

A second evaluation was conducted utilizing the aforedescribed procedure. In this evaluation comparisons were made against commercial grade sulfonated polystyrenes and certain maleic anhydride polymers. In this test the percentage inhibition was determined from the measurement of the residual phosphate ion.

TABLE IV

| Treatment | % Sulfonated Polystyrene Moieties | % Maleic Anhydride Moieties | % Calcium Phosphate Inhibition |
|---|---|---|---|
| Copolymer A* | 75 | 25 | 100 |
| Copolymer B* | 66.6 | 33.3 | 90.2 |
| Copolymer C* | 50 | 50 | 75.4 |
| SPS (MW 34,000) | 100 | — | 62.3 |
| SPS (MW 70,000) | 100 | — | 47.6 |
| SPS (MW 400,000) | 100 | — | 14.6 |
| SPS (MW 700,000) | 100 | — | 4.1 |
| Ethylene Maleic Anhydride Polymer | — | 100 | <5 |
| Maleic Anhydride Telomer | — | 100 | <5 |

*Molecular Weight About 4,000

The data of Table IV clearly established that the homopolymers of sulfonated polystyrene, maleic anhydride and ethylene maleic anhydride polymers do not control calcium phosphate as well as the polymers of the instant invention. In addition, the data confirmed the importance of having at least a mole ratio of 2 or greater of sulfonated styrene to 1 of maleic anhydride.

The invention is applicable to any aqueous system where calcium phosphate formation and precipitation is a potential problem. For example, the inventive process would be effective in gas scrubbing systems where scrubbing mediums, such as primary sewage effluents which contain high phosphate levels are used as the scrubbing or washing medium. These systems would have the prerequisite for the formation and deposition of calcium phosphate which is to be avoided. The additional areas of application will be apparent to those operating in the areas of process water systems.

Efficacy in Related Areas

In order to determine the efficacy of the polymers of the invention in related areas, certain tests were conducted to
(i) establish the dispersive effect of the polymers on suspended matter, more specifically clay and iron oxide, and
(ii) establish the capability of the polymers to inhibit the formation and thereby the deposition of calcium carbonate in an aqueous system where the effect was likely to occur.

The protocols followed and the results of the tests were as follows:

A. Deflocculation and Dispersion of Suspended Matter

A 0.1% iron oxide or clay suspension in deionized water was prepared. The hardness of the slurry was adjusted to 200 ppm as $CaCO_3$ and the resultant medium was mixed for the time required to obtain a uniform suspension. The pH was then adjusted to the testing level.

Aliquots of the suspension were drawn off, placed in glass bottles and the appropriate amount of treatment added. The samples were then shaken to insure good mixing of treatment and suspension. Using a turbidimeter or an instrument which measures light transmission, the effect of the treatment compared to a control (suspension to which no treatment was added) was measured. Treatments causing an increase in turbidity or a decrease in light transmitted are considered dispersants.

B. Calcium Carbonate Studies

An environment was produced containing known quantities of water soluble calcium chloride and sodium carbonate under specific pH and temperature conditions. Treatments were added to various samples of the solution and the amount of calcium remaining in solution after a period of time was measured and compared to a Control. The test measured quite accurately the capacity of the polymers to inhibit the formation and ultimate deposition of calcium carbonate.

The treatment utilized consisted of 10 ppm of A, a 3:1 SS/MA polymer; B, a 2:1 SS/MA polymer; and C, a 1:1 SS/MA polymer, having molecular weights of about 4,000. The results expressed as % $CaCO_3$ inhibition were respectively 29.6%, 29.3%, and 36.6%. The polymers were considered to be significant since they did show efficacy. Although the degree of efficacy was perhaps lower than those polymers currently commercially available for calcium carbonate control, this capacity of the polymers when considered together with the results achievable against calcium and magnesium phosphates and silicates, iron oxides, mud, and clay make the use of these polymers clearly an important advancement in the art.

C. Calcium Sulfate Studies

In order to establish the efficacy of the copolymers of the invention as regards calcium sulfate crystallization inhibition, studies were conducted in the same manner as indicated for the calcium carbonate determinations. An environment was produced containing known and sufficient quantities of water soluble calcium chloride and sodium sulfate to form about 6800 parts of calcium sulfate per million parts of water. The test was conducted at a pH of 7, 50° C. with an equilibration time of 24 hours.

Treatments were added to various samples of the solution and the amount of calcium remaining in solution after a period of time was measured and compared to an untreated sample (control). As with the calcium carbonate, the test measured quite accurately the capacity of the polymers to inhibit the formation and ultimate deposition of calcium sulfate crystals. The copolymer tested was a 3:1 mole ratio of sulfonated styrene to maleic anhydride with a molecular weight of about 4,000. At dosages of 3 ppm, 5 ppm and 10 ppm, the

TABLE V

| | Dispersion Properties of SS/MA Polymers | | | | |
|---|---|---|---|---|---|
| | Mole ratio | Δ% T. *$Fe_2O_3$ Dispersion | | Δ% T. *Clay Dispersion | |
| Treatment (10 ppm active) | SS:MA | ½ hr. | 18 hr | ½ hr | 18 hr |
| SS/MA Polymers** | 3:1 | 14.8 | 83.2 | 7.8 | 86.0 |
| SS/MA Polymers** | 2:1 | 18.9 | 89.8 | 6.4 | 84.8 |
| SS/MA Polymers** | 1:1 | 12.3 | 84.8 | 5.0 | 86.0 |

*The higher the Δ% T the better the treatment's ability to disperse
**Molecular weight about 4,000

As apparent from the results of the studies recorded in Table V, the polymers of the invention and even the SS/MA polymer having a 1:1 ratio were quite effective in dispersing the suspended matter after an 18 hour duration. The ½ hour duration results, although not overwhelming, were acceptable for all practical purposes since the 18 hour test is felt to be the more important result.

percent inhibitions were respectively 36, 60, and 74, which are considered to be quite good in the industry, particularly because of the efficacy against the other stated materials.

D. Sulfonation Study

The contribution of sulfonation on the efficacy of the copolymers of the instant invention, i.e., sodium salt of sulfonated styrene-maleic anhydride copolymers (SS/MA) was investigated to a certain degree and was only partially resolved. The data indicated that sulfonation contributes quite beneficially. The drawback to complete resolution of the question was due to the difficulty in obtaining a total solution of the 3:1 mole ratio styrene-maleic anhydride polymer so that a "truly" representative sample could be evaluated.

The following is a synopsis of the work performed in this area:

Styrene-maleic anhydride polymers (SMA) are available in the 1:1, 2:1, and 3:1 styrene to maleic anhydride mole ratios and are reported to have a 1600–2000 molecular weight. However, conversion to a useable soluble form (i.e., ammonium or sodium salts) becomes more difficult as the styrene content increases. Emphasis was directed toward the 3:1 mole ratio because this mole ratio was found to be the most effective copolymer of the present invention. Although the manufacturer's literature recommended conversion to the ammonium salt, attempts were made to convert the 3:1 SMA polymer to both the ammonium salt and the sodium salt. This manufacturer's procedure was not effective for the 3:1 SMA since some copolymer remained insoluble. Boiler test results indicated the material to be quite ineffective.

Therefore, attention was directed toward neutralization of the sodium salt. The SMA (3:1 ratio) was at least partially converted to the sodium salt by a procedure outlined by the manufacturer except the proper amount of sodium hydroxide, rather than ammonium hydroxide, was employed based on the acid numbers provided and higher temperatures were used. The solution which resulted from the 3:1 solubilization still contained some insoluble material and it is not known whether the resultant solution was representative of the dry material, although it is estimated that 90 to 95% of the copolymer went into solution.

However, the 3:1 copolymer (SMA) solutions (one the ammonium salt and the other the sodium salt) were evaluated and the results and the testing conditions are set forth in the following Table. The comparative test results established quite conclusively that the sulfonated polymers of the invention performed quite superiorly.

TABLE VI

| Polymer Treatment | Salt | Treatment Conc ppm | Boiler Balances "P" Alk | RSiO$_2$ | Deposit (g/ft$^2$)* |
|---|---|---|---|---|---|
| SMA | NH$_4$ | 10 | 180 | 14 | >8.85** |
| SMA | NH$_4$ | 10 | 198 | 19 | 14.52 |
| SMA | Na | 5 | 158 | 19 | >11.85** |
| SMA | Na | 5 | 170 | 21 | 15.57 |
| SMA | Na | 10 | 184 | 33 | 2.69 |
| SSMA | Na | 5 | 186 | 18 | 0.98 |
| SSMA | Na | 5 | 184 | 19 | 0.83 |
| SSMA | Na | 10 | 184 | 26 | 0.91 |

*Deposits composed of Ca, PO$_4$, MgO, SiO$_2$ and Insolubles (iron oxide and magnesium silicate)
**Heavy deposit, some of which sloughed off Test conditions:
Boiler No. 2
Pressure: 300 psig
Heat Flux: 185,000 BTU/ft$^2$/hr
Cycles: 15
Feedwater Hardness: 15 ppm as CaCO$_3$ (10 Ca/5 Mg)
Phosphate Residual: 20 ppm
Molecular Weight of
  SSMA polymers: about 4,000

COMPARATIVE STUDIES

Steam Generation Studies

Additional studies were carried out to show the unexpected activity of the polymers containing sulfonation. In particular, comparative studies were conducted under steam generating conditions in an experimental boiler, in one instance, and under general ambient conditions in the other.

The experimental boiler used is described on page 7 of this application.

The polymer treatments used, the dosage levels utilized, the respective operational conditions of the boiler, and the test results are set forth below and in Table VII which follows.

Copolymer A was composed of styrene and maleic anhydride moieties, with the ratio of styrene to maleic anhydride being 2:1, and possessed a molecular weight of about 1700.

Copolymer B (polymer of the present invention) was composed of sulfonated styrene and maleic anhydride moieties with the ratio of sulfonated styrene to maleic anhydride being 2:1. The polymer possessed a molecular weight of about 4,000.

The Test Conditions used in the boiler were as follows:
Pressure: 300 psig
Heat Flux: 185,000 BTU/ft$^2$/hr.
Residual Phosphate: 20 ppm
Feedwater Hardness: 15 ppm as CaCO$_3$ (10 ppm Ca/5 ppm Mg)

The results determined are recorded in the following Table.

TABLE VII

| Treatment | Dosage (ppm) | Boiler Balances "P" Alkalinity (ppm) | R SiO$_2$ (ppm) | Total Deposit g/ft$^2$ |
|---|---|---|---|---|
| Copolymer A | 14 | 224 | 25 | 8.24 |
| Copolymer A | 14 | 182 | 110 | 4.86 |
| Copolymer A | 5 | 198 | 18 | 15.90 |
| Copolymer B | 14 | 212 | 35 | 0.56 |
| Copolymer B | 10 | 170 | 23 | 0.91 |
| Copolymer B | 5 | 188 | 19 | 2.87 |

The deposits, ingredients-wise, were like those as analyzed and described in the results of the boiler testing set forth earlier in this application, namely a combination of calcium and magnesium phosphates and silicates and iron oxide.

The comparative testing of the 2:1 polymers established quite clearly that sulfonation of the styrene moiety in accordance with the present invention produced results which were not only unexpected and unpredictable from the prior art but certainly vastly superior to the unsulfonated.

Additional steam generation (boiler) studies were conducted to further illustrate the effectiveness of the copolymers of the present invention (SSMA) as compared with the unsulfonated polymers (SMA). The same experimental boiler as heretofore used was employed in the additional studies. The test conditions and the results are recorded in the following Tables VIII and IX.

TABLE VIII

SMA AND SSMA TREATMENTS AT 600 PSIG AND 185,000 BTU/FT$^2$/HR. HEAT FLUX

| Treatment | "P" Alk. (ppm) | R SiO$_2$ (ppm) | Deposits (g/ft$^2$) Upper | Lower | Total |
|---|---|---|---|---|---|
| Control | 244 | 41 | 4.08 | 4.49 | 8.56 |
| SSMA (2:1) | 216 | 30 | 0.78 | 0.68 | 1.46 |
| SMA (2:1) | 245 | 35 | 1.06 | 1.34 | 2.40 |
| SSMA (3:1) | 145 | 27 | 0.74 | 0.67 | 1.41 |
| SSMA (3:1) | 209 | 36 | 0.98 | 0.72 | 1.70 |
| SMA (3:1) | 248 | 35 | 1.37 | 1.26 | 2.63 |
| SMA (3:1) | 166 | 53 | 1.19 | 1.35 | 2.54 |

Boiler Conditions: Hardness - 15 ppm as CaCO$_3$ (10 ppm Ca/5 ppm Mg)
Treatment - 10 ppm (in boiler)
Cycles - 15
Molecular Weights -
SSMA polymers about 4,000
2:1 SMA = 1700
3:1 SMA = 1900

TABLE IX

SMA AND SSMA TREATMENTS AT 900 PSIG AND 100,000 BTU/FT$^2$/HR. HEAT FLUX

| Treatment | "P" Alk. (ppm) | R SiO$_2$ (ppm) | Deposits (g/ft$^2$) Upper | Lower | Total |
|---|---|---|---|---|---|
| Control | 136 | 15 | 3.83 | 2.21 | 6.04 |
| SSMA (2:1) | 218 | 28 | 0.34 | 0.39 | 0.73 |
| SMA (2:1) | 213 | 30 | 1.02 | 0.99 | 2.01 |
| SSMA (3:1) | 218 | 26 | 0.72 | 0.55 | 1.27 |
| SMA (3:1) | 217 | 28 | 2.77 | 2.70 | 5.47 |

Boiler Conditions: Hardness - 15 ppm as CaCO$_3$ (10 ppm Ca/5 ppm Mg)
Treatment - 10 ppm (in boiler)
Cycles - 15
Molecular Weights of polymers same as in Table VIII The results recorded in Tables VI, VII, VIII and IX unequivocally establish that the polymers of the present invention as claimed are vastly superior over comparable, but unsulfonted polymers. Tests using the 1:1 polymers were also conducted under the conditions recited in Tables VIII and IX, but the comparisons were inconclusive in that the SSMA was more effective under one set of conditions while the SMA was more effective under the other. Consistent results using the polymers of the present invention were obtainable at the 2:1 and higher mole ratios. These polymers perform most impressively over all of the sets of conditions tested.

Additional experimentations utilizing the polymers of the invention and their unsulfonated counterparts were conducted at conditions which are considered severe and are seldom, if ever, encountered in the field. These conditions were ultimately found to be outside the capacity of the experimental boilers. The tests utilized feedwater having 30 ppm of hardness and cycled 15 times. Previous testing using other commercially available material indicated that 45 ppm feedwater hardness and cycled 15 times was entirely too severe. In these tests severe pocking of the deposits on the probe was observed (about 95% of the deposit pocked off) and thus the accuracy of the tests and the results were in doubt. The same problem was experienced utilizing the feedwater hardness of 30 ppm cycled 15 times. Pocking was also experienced. In view of of those experiences, the comparative tests were conducted in a feedwater hardness of 15 ppm cycled 15 times. It should be pointed out, however, that these conditions are not customarily experienced in industrial systems since they are considered to be harsh. As explained in the Background of the Invention, external treatment, e.g., clarification, softening, etc., of the boiler feedwater is always used to lower the hardness to an acceptable range.

Accordingly, the polymers of the present inventions are effective over the conditions encountered in commercial steam production systems.

Calcium Phosphate Inhibition

Additional studies were conducted to compare the sulfonated and unsulfonated polymers as regards calcium phosphate crystallization inhibition and dispersion. As indicated earlier in the specification (see discussion immediately prior to Tables III and IV), cooling water systems as well as some scrubber systems are prone to calcium phosphate deposition problems because of the generally high content of these calcium and phosphate ions (occurring either naturally or as treatment).

Accordingly, the polymers were tested to further establish their superiority over the non-sulfonated counterparts. The calcium phosphate test procedure utilized is that described in the discussion immediately prior to Tables III and IV, and is similar to that described in "Standard Methods for the Examination of Water and Wastewater", American Public Health Association and American Waterworks Association, 13th edition, 1971.

The polymers tested were as follows:

Copolymer A was a styrene-maleic anhydride copolymer with a ratio of styrene to maleic anhydride of 2:1 and a molecular weight of about 1700.

Copolymer B was a sulfonated styrene-maleic anhydride copolymer with a ratio of sulfonated styrene to maleic anhydride of 2:1 and a molecular weight of about 4,000.

The results obtained as regards calcium phosphate control are recorded in the following Table X.

TABLE X

| Treatment | Treatment Dosage (ppm) | % Inhibition Calcium (1) | Orthophosphate (2) |
|---|---|---|---|
| Copolymer A | 10 | 2.5 | 1.6 |
| Copolymer B | 10 | 90.2 | 89.6 |

All stock solutions used for phosphate test coincided with historical 17 hour % transmission data.

The raw data which, when fed into the equation, and which provided the % inhibition was as follows:

|  | Copolymer A (1) | (2)* | Copolymer B (1) | (2)* |
|---|---|---|---|---|
| ppm PO$_4$ treated | 0.25 | 0.25 | 5.6 | 5.67 |
| ppm PO$_4$ control | 0.1 | 0.15 | 0.1 | 0.15 |
| ppm PO$_4$ stock solution | 6.2 | 6.3 | 6.2 | 6.3 |
| ppm PO$_4$ control | 0.1 | 0.15 | 0.1 | 0.15 |

*duplicate runs

The comparative tests illustrated conclusively that the sulfonated styrene copolymer as per the instant invention was vastly superior to the non-sulfonated styrene copolymer in the control of calcium phosphate precipitate.

To further illustrate the superiority of the polymers of the present invention over their non-sulfonated counterparts, additional studies were conducted utilizing the calcium phosphate test procedure earlier described herein.

The results of the testing and the test conditions are set forth in Table XI which follows.

TABLE XI
COMPARISON OF SSMA AND SMA EFFICACIES AS CALCIUM PHOSPHATE INHIBITORS

| Treatment | Dosage (ppm) | Condition #1 % Inhibition | Condition #2 % Inhibition | Condition #3 % Inhibition |
|---|---|---|---|---|
| SMA 2:1 (MW 1700) | 5 | 0 | 0.6 | 0 |
| SMA 2:1 (MW 1700) | 10 | 2.2 | 6.4 | 0.9 |
| SSMA 2:1 (MW 4000) | 5 | 8 | 11 | 0 |
| SSMA 2:1 (MW 4000) | 10 | 22 | 56 | 2.6 |
| SMA 3:1 (MW 1700) | 5 | 0.3 | — | 0.9 |
| SMA 3:1 (MW 1700) | 10 | 0.3 | 0 | 5.2 |
| SSMA 3:1 (MW 4000) | 5 | 14 | 19 | 2.6 |
| SSMA 3:1 (MW 4000) | 10 | 20 | 94 | 5.2 |

Condition 1: 175 ppm $Ca^{+2}$, 6 ppm $PO_4^{-3}$, pH 7.5, 90° C.
Condition 2: 250 ppm $Ca^{+2}$, 6 ppm $PO_4^{-3}$, pH 8.5, 70° C.
Condition 3: 300 ppm $Ca^{+2}$, 6 ppm $PO_4^{-3}$, pH 9.0, 90° C.
The raw data which was utilized in the equation to arrive at % inhibition were as follows:

| Treatment | 17 hr. Absorbance C 640 μm Wavelength ppm | | $PO_4^{-3}$ From Curve ppm | |
|---|---|---|---|---|
| CONDITION 1 | | | | |
| | 5 | 10 | 5 | 10 |
| SMA 2:1 (MW 1700) | 35.1 | 39.3 | .3 | .49 |
| SMA 3:1 (MW 1900) | 36.8 | 36.0 | .37 | .37 |
| SSMA 2:1 (MW 4000) | 53.5 | 84.0 | 0.85 | 1.71 |
| SSMA 3:1 (MW 4000) | 65.5 | 80.0 | 1.20 | 1.60 |
| Control (no treatment) $\overline{X}$ = 35.4% | | | 0.35 ppm $PO_4^{-3}$ | |
| Stock Solution | | 268% | 6.60 ppm $PO_4^{-3}$ | |
| CONDITION 2 | | | | |
| | 5 | 10 | 5 | 10 |
| SMA 2:1 (MW 1700) | 35 | 46 | .35 | .65 |
| SMA 3:1 (MW 1900) | 56 | 33 | .91 | .28 |
| SSMA 2:1 (MW 4000) | 56 | 137 | 0.91 | 3.20 |
| SSMA 3:1 (MW 4000) | 69 | 212 | 1.30 | 5.22 |
| Control (no treatment) $\overline{X}$ = 34.2% | | | 0.32 ppm $PO_4^{-3}$ | |
| Stock Solution | | 224% | 5.51 ppm $PO_4^{-3}$ | |
| CONDITION 3 | | | | |
| | 5 | 10 | 5 | 10 |
| SMA 2:1 (MW 1700) | 32.3 | 33.1 | .25 | .3 |
| SMA 3:1 (MW 1900) | 35 | 42.5 | .3 | .55 |

TABLE XI-continued
COMPARISON OF SSMA AND SMA EFFICACIES AS CALCIUM PHOSPHATE INHIBITORS

| SSMA 2:1 (MW 4000) | 27 | 36.5 | 0.1 | 0.40 |
|---|---|---|---|---|
| SSMA 3:1 (MW 4000) | 37.5 | 43.0 | 0.4 | 0.55 |
| Control (no treatment) $\overline{X}$ = 32.3% | | 0.25 ppm $PO_4^{-3}$ | | |
| Stock Solution | 245% | 6.05 ppm $PO_4^{-3}$ | | |

It is apparent that under the conditions normally found in cooling water and scrubber systems, namely conditions #1 and #2, the sulfonated polymers were significantly superior. Under the rather severe conditions imposed by condition #3, namely 300 ppm $Ca^{+2}$, pH 9.0 and 90° C., the polymers appear to be comparable. For these conditions the dosage of polymer used was insufficient to provide a meaningful comparison. Accordingly another series of tests were conducted to establish the effects of higher treatment levels. The results of these tests are recorded in the following Table XII. The raw data determined was like that as recorded for the previous tests and is not reported here because of the cumbersome nature of the data.

TABLE XII

| Treatment | Percent Inhibition at Dosages Indicated in ppm | | | | | | | | | |
|---|---|---|---|---|---|---|---|---|---|---|
| | 1 | 5 | 10 | 25 | 50 | 100 | 200 | 300 | 400 | 500 |
| SSMA 3:1 (MW 4000) | 0 | 0 | 12.7 | 94.2 | 85.5 | 98.2 | 100 | 98.2 | 96.2 | 98.2 |
| SSMA 2:1 (MW 4000) | 0 | 0 | 0 | 80.0 | 83.6 | 89.1 | 83.6 | 89.1 | 90.9 | 94.2 |
| SMA 3:1 (MW 1700) | 0 | 0 | 0.2 | 1.8 | 0 | — | — | — | — | — |
| SMA 2:1 (MW 1700) | 0 | 0 | 1.8 | 0 | 0 | — | — | — | — | — |

The overall conclusion to be drawn from the data set forth herein and the data derived through the comparisons is that the sulfonated polymers, as claimed, are not only quite effective, but are more effective than their non-sulfonated counterparts.

Having thus described the invention what we claim is:

1. A method of controlling the formation and deposition of materials on the structural parts of a system containing an aqueous medium, which in turn contains ions which would otherwise form and deposit as said materials, which comprises introducing into the aqueous medium an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

2. A method according to claim 1, wherein the amount of polymer introduced is from about 0.5 to about 100 parts of polymer per million parts of water in said system.

3. A method according to claim 2, wherein the polymer has a molecular weight of from about 500 to 100,000.

4. A method according to claim 2, wherein the polymer possesses a ratio of said styrene moieties to said anhydride derived moieties of 3:1.

5. A method according to claim 1, wherein the polymer possesses a ratio of said styrene moieties to said anhydride derived moieties of from about 2:1 to 3:1.

6. A method according to claim 5, wherein the polymer introduced is in an amount of from about 0.5 to about 100 parts per million parts of water.

7. A method according to claim 6, wherein the polymer has a molecular weight of from about 500 to 100,000.

8. A method according to claim 7, wherein the polymer introduced is from about 2.5 to 25 parts per million parts of water in said system.

9. A method according to claim 8, wherein the polymer is in the form of the sodium salt of said polymer.

10. A method according to claim 5, wherein the system is a gas scrubbing system.

11. A method of controlling the formation and deposition of at least one compound selected from the group consisting of calcium phosphate, magnesium phosphate, magnesium silicate, calcium silicate, and iron oxide and mixtures thereof on the structural parts of a system containing an aqueous medium which in turn contains the compounds or ions which would otherwise lead to the formation and deposition of said compound or compounds, which comprises introducing into the aqueous medium an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

12. A method according to claim 11, wherein the amount of polymer introduced is from about 0.5 to about 100 parts of polymer per million parts of water in said system.

13. A method according to claim 12, wherein the polymer has a molecular weight of from about 500 to 100,000.

14. A method according to claim 13, wherein the polymer possesses a ratio of said styrene moieties to said anhydride derived moieties of about 2:1 to 3:1.

15. A method according to claim 11, wherein the polymer possesses a ratio of said styrene moieties to said anhydride derived moieties of 3:1.

16. A method according to claim 15, wherein the polymer introduced is in an amount of from about 0.5 to about 100 parts per million parts of water.

17. A method according to claim 16, wherein the polymer has a molecular weight of from about 500 to 100,000.

18. A method according to claim 17, wherein the polymer introduced is from about 2.5 to 25 parts per million parts of water in said system.

19. A method according to claim 18, wherein the polymer is in the form of the sodium salt of said polymer.

20. A method according to claim 18, wherein the system is a cooling water system and wherein the compound is calcium phosphate.

21. A method according to claim 15, wherein the system is a cooling water system and wherein the compound is calcium phosphate.

22. A method according to claim 15, wherein the system is a gas scrubbing system.

23. A method of dispersing a compound selected from the group of iron oxide, clay and mixtures thereof contained in an aqueous medium which would otherwise deposit on the structural parts containing said medium, which comprises introducing in said medium an effective amount for the purpose of a polymer or the water soluble salt of said polymer, which polymer is comprised of sulfonated styrene moieties and moieties derived from maleic anhydride, the ratio of said styrene to said maleic anhydride derived moieties being from about 1:1 to about 4:1.

24. A method according to claim 23, wherein the aqueous medium is the cooling medium of a cooling water system and where the polymer is added to said aqueous medium in an amount of 0.5 to 100 parts per million parts of aqueous medium, and the mole ratio of styrene to maleic anhydride is from about 1:1 to 3:1.

25. A method according to claim 23, wherein the aqueous medium is the scrubbing medium for a gaseous system containing iron oxide and where the polymer is added to said aqueous medium in an amount of 0.5 to 100 parts per million parts of aqueous medium, and the mole ratio of styrene to maleic anhydride is from about 1:1 to 3:1.

26. A method according to claim 23, wherein the aqueous medium is contained in a steam generating system and where the polymer is added to said aqueous medium in an amount of 0.5 to 100 parts per million parts of aqueous medium, and the mole ratio of the styrene to said maleic anhydride is from about 1:1 to 3:1.

27. A method according to claim 23, wherein the polymer has a molecular weight of from about 500 to 100,000.

28. A method according to claim 27, wherein the polymer is introduced in an amount of 2.5 to 25 parts per million parts of water.

29. A method according to claim 28, wherein the polymer possesses a ratio of said styrene moieties to said anhydride derived moieties of 3:1.

30. A method according to claim 29, wherein the polymer is in the sodium salt form.

31. A method of controlling the formation and deposition of materials on the structural parts of a steam generating system containing an aqueous medium which in turn contains the materials or ions which would otherwise form and deposit as said materials, which comprises introducing into the aqueous medium an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

32. A method according to claim 31, wherein the amount of polymer introduced is from about 0.5 to about 100 parts of polymer per million parts of water in said system.

33. A method according to claim 32, wherein the polymer has a molecular weight of from about 500 to 100,000.

34. A method according to claim 33, wherein the polymer possesses a ratio of said styrene moieties to said anhydride derived moieties of 3:1.

35. A method according to claim 31, wherein the polymer possesses a ratio of said styrene moieties to said anhydride derived moieties of from about 2:1 to 3:1.

36. A method according to claim 35, wherein the polymer introduced is in an amount of from about 0.5 to about 100 parts per million parts of water.

37. A method according to claim 36, wherein the polymer has a molecular weight of from about 500 to 100,000.

38. A method according to claim 37, wherein the polymer introduced is from about 2.5 to 25 parts per million parts of water in said system.

39. A method according to claim 38, wherein the polymer is in the form of the sodium salt of said polymer.

40. A method of controlling the formation and deposition of at least one compound selected from the group consisting of calcium phosphate, magnesium phosphate, calcium silicate, magnesium silicate, and iron oxide and mixtures thereof on the structural parts of a steam generating system containing an aqueous medium which in turn contains ions which would otherwise lead to the formation and deposition of said compound or compounds, which comprises introducing into the aqueous medium an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

41. A method according to claim 40, wherein the amount of polymer introduced is from about 0.5 to about 100 parts of polymer per million parts of water in said system.

42. A method according to claim 41, wherein the amount is from about 2.5 to 25 parts.

43. A method according to claim 42, wherein the polymer has a molecular weight of from about 500 to 100,000.

44. A method according to claim 43, wherein the polymer possesses a ratio of said styrene moieties to said anhydride derived moieties of from about 2:1 to 3:1.

45. A method according to claim 40, wherein the polymer possesses a ratio of said styrene moieties to said anhydride derived moieties of about 3:1.

46. A method according to claim 45, wherein the polymer introduced is in an amount of from about 0.5 to about 100 parts per million parts of water.

47. A method according to claim 46, wherein the polymer has a molecular weight of from about 500 to 100,000.

48. A method according to claim 47, wherein the polymer is in the form of the sodium salt of said polymer.

49. A method according to claim 48, wherein the compound is calcium phosphate.

50. A method according to claim 40, wherein the compound is calcium phosphate.

51. A method according to claim 40, wherein the polymer has a molecular weight of about 4,000.

52. A method according to claim 51 wherein the amount of polymer introduced is from about 0.5 to about 100 parts per million parts of water.

53. A method according to claim 52, wherein the polymer possesses a ratio of said styrene moieties to said anhydride moieties of about 2:1 to about 3:1.

54. A method according to claim 53, wherein the polymer possesses a ratio of said styrene moieties to said anhydride of 3:1.

55. A method according to claim 54, wherein the polymer is introduced in an amount of 2.5 to 25 parts per million parts of water.

56. A method according to claim 55, wherein the polymer is in the sodium salt form.

57. A method of controlling the formation and deposition of at least one compound selected from the group consisting of calcium carbonate, calcium sulfate, calcium phosphate, magnesium phosphate, magnesium silicate, calcium silicate, and iron oxide and mixtures thereof on the structural parts of a system containing an aqueous medium which in turn contains the compounds or ions which would otherwise lead to the formation and deposition of said compound or compounds, which comprises introducing into the aqueous medium an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

58. A method of controlling the formation and deposition of at least one compound selected from the group consisting of calcium carbonate, calcium sulfate, calcium phosphate, magnesium phosphate, calcium silicate, magnesium silicate, and iron oxide and mixures thereof on the structural parts of a steam generating system containing an aqueous medium which in turn contains ions which would otherwise lead to the formation and deposition of said compound or compounds, which comprises introducing into the aqueous medium an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

59. A method of inhibiting deposits of scale, sludge and other foulants in aqueous systems, said method consisting essentially of adding to said systems 0.05 to 100 ppm of a composition selected from the group consisting of water-soluble copolymers of sulfonated styrene moieties and moieties derived from maleic anhydride, the ratio of said styrene moieties to said maleic anhydride derived moieties being from about 2:1 to about 3:1.

* * * * *

REEXAMINATION CERTIFICATE (529th)
United States Patent [19]
Godlewski et al.

[11] B1 4,288,327
[45] Certificate Issued Jul. 15, 1986

[54] COPOLYMERS FOR THE CONTROL OF THE FORMATION AND DEPOSITION OF MATERIALS IN AQUEOUS MEDIUMS

[75] Inventors: Irene T. Godlewski, Cinnaminson, N.J.; Joseph J. Schuck, Holland; Andrew S. Chisarik, Cornwells Heights, both of Pa.

[73] Assignee: Betz Laboratories, Inc., Trevose, Pa.

Reexamination Request:
No. 90/000,737, Mar. 11, 1985

Reexamination Certificate for:
Patent No.: 4,288,327
Issued: Sep. 8, 1981
Appl. No.: 4,646
Filed: Jan. 19, 1979

Related U.S. Application Data

[63] Continuation-in-part of Ser. No. 689,755, May 25, 1976, abandoned, which is a continuation-in-part of Ser. No. 610,952, Sep. 8, 1975, abandoned.

[51] Int. Cl.$^4$ .............................................. C02F 5/10
[52] U.S. Cl. ................................................. 210/698
[58] Field of Search .............................. 210/696–701; 252/82, 175, 180, DIG. 2, DIG. 11

[56] References Cited

U.S. PATENT DOCUMENTS

| | | | |
|---|---|---|---|
| 2,650,905 | 9/1953 | Fordyce | 252/8.5 |
| 2,723,956 | 11/1955 | Johnson | 210/23 |
| 2,764,576 | 9/1956 | Blaser et al. | 260/79.3 |
| 2,783,200 | 2/1957 | Crum | 210/701 |
| 3,072,618 | 1/1963 | Turbak | 260/79.3 |
| 3,188,289 | 6/1965 | Kahler et al. | 210/58 |
| 3,276,998 | 10/1966 | Green | 210/52 |
| 3,289,734 | 12/1966 | Robertson | 159/47 |
| 3,409,080 | 11/1968 | Harrison | 166/31 |
| 3,421,584 | 1/1969 | Eilers | 166/33 |
| 3,463,730 | 8/1969 | Booth | 210/701 |
| 3,544,461 | 12/1970 | Boone et al. | 252/8.5 |
| 3,547,817 | 12/1970 | Hansen et al. | 210/58 |
| 3,549,538 | 12/1970 | Jacklin | 252/82 |
| 3,629,105 | 12/1971 | Weiss | 252/3.55 |
| 3,630,937 | 12/1971 | Baum | 252/181 |
| 3,650,970 | 3/1972 | Pratt et al. | 252/181 |
| 3,666,664 | 5/1972 | Lorenc | 252/180 |
| 3,696,043 | 10/1972 | Labarge et al. | 252/153 |
| 3,715,307 | 2/1973 | Johnson et al. | 210/58 |
| 3,730,900 | 5/1973 | Perricone et al. | 252/8.5 |
| 3,793,228 | 2/1974 | Kandler et al. | 252/541 |
| 3,804,770 | 8/1974 | Lorenc | 252/180 |
| 3,810,834 | 5/1974 | Jones et al. | 210/58 |
| 3,952,805 | 4/1976 | Persinski et al. | 166/293 |
| 4,001,134 | 1/1977 | Markofsky et al. | 252/180 |
| 4,048,066 | 9/1977 | Cuisia et al. | 210/58 |
| 4,255,259 | 3/1981 | Hwa | 210/699 |

OTHER PUBLICATIONS

Swanson, "The Use of Polymeric Materials with Phosphate and Chelation Type Boiler Water Treatment", The International Water Conference Twenty Eighth Annual Meeting, Dec. 11-13, 1967, Pittsburgh, Penn. pp. 81-84.

Sexsmith, "The Use of Polymers for Water Treatment", The International Water Conference Thirtieth Annual Meeting, Dec. 28-30, 1969, Pittsburgh, Penn. pp. 15-24.

Zeleny, "The Role of Organic Additives in Preventing Scale Formation on Heating Surfaces" Combustion, Feb. 1963, pp. 47-49.

Gray, Composition and Properties of Oil Well Drilling Fluids, Fourth Edition, Gulf Publishing Company, Houston, pp. 5-7.

*Primary Examiner*—Ernest G. Therkorn

[57] ABSTRACT

The present invention relates to processes for controlling the formation and deposition of scale and sludge and in particular calcium phosphate which would otherwise occur in aqueous mediums containing sludge and the ions capable of forming scale. The invention, more particularly, relates to the control, reduction and/or prevention of scale and sludge deposits in cooling water, scrubber and steam generating systems, evaporators, economizers, and the like by the introduction of a copolymer comprising sulfonated styrene and maleic anhydride moieties to the water used therein. The copolymers discovered to be particularly effective for the purpose are those having a mole ratio of sulfonated styrene moieties to moieties derived from maleic anhydride of from about 2:1 to about 4:1 and preferably 2:1 to 3:1 with certain type deposits.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 59 is confirmed.

Claims 1, 11, 23-26, 31, 40, 57 and 58 are determined to be patentable as amended.

Claims 2-10, 12-22, 27-30, 32-39 and 41-56, dependent on an amended claim, are determined to be patentable.

New claims 60-67 are added and determined to be patentable.

1. A method of controlling the formation and deposition of materials on the structural parts of a system containing [an aqueous medium] *water*, which in turn contains ions which would otherwise form and deposit as said materials, which comprises introducing into the [aqueous medium] *water* an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

11. A method of controlling the formation and deposition of at least one compound selected from the group consisting of calcium phosphate, magnesium phosphate, magnesium silicate, calcium silicate, and iron oxide and mixtures thereof on the structural parts of a system containing [an aqueous medium] *water*, which in turn contains the compounds or ions which would otherwise lead to the formation and deposition of said compound or compounds, which comprises introducing into the [aqueous medium] *water* an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

23. A method of dispersing a compound selected from the group of iron oxide, clay and mixtures thereof contained in [an aqueous medium] *water* which would otherwise deposit on the structural parts containing said [medium] *water*, which comprises introducing in said [medium] *water* an effective amount for the purpose of a polymer or the water soluble salt of said polymer, which polymer is comprised of sulfonated styrene moieties and moieties derived from maleic anhydride, the ratio of said styrene to said maleic anhydride derived moieties being from about 1:1 to about 4:1.

24. A method according to claim 23, wherein the [aqueous medium] *water* is the cooling medium of a cooling water system and where the polymer is added to said [aqueous medium] *water* in an amount of 0.5 to 100 parts per million parts of [aqueous medium] *water*, and the mole ratio of styrene to maleic anhydride is from about 1:1 to 3:1.

25. A method according to claim 23, wherein the [aqueous medium] *water* is the scrubbing medium for a gaseous system containing iron oxide and where the polymer is added to said [aqueous medium] *water*, in an amount of 0.5 to 100 parts per million parts of [aqueous medium] *water*, and the mole ratio of styrene to maleic anhydride is from about 1:1 to 3:1.

26. A method according to claim 23, wherein the [aqueous medium] *water* is contained in a steam generating system and where the polymer is added to said [aqueous medium] *water* in an amount of 0.5 to 100 parts per million parts of [aqueous medium] *water*, and the mole ratio of the styrene to said maleic anhydride is from about 1:1 to 3:1.

31. A method of controlling the formation and deposition of materials on the structural parts of a steam generating system containing [an aqueous medium] *water*, which in turn contains the materials or ions which would otherwise form and deposit as said materials, which comprises introducing into the [aqueous medium] *water* an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

40. A method of controlling the formation and deposition of at least one compound selected from the group consisting of calcium phosphate, magnesium phosphate, calcium silicate, magnesium silicate, and iron oxide and mixtures thereof on the structural parts of a steam generating system containing [an aqueous medium] *water*, which in turn contains ions which would otherwise lead to the formation and deposition of said compound or compounds, which comprises introducing into the [aqueous medium] *water* an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

57. A method of controlling the formation and deposition of at least one compound selected from the group consisting of calcium carbonate, calcium sulfate, calcium phosphate, magnesium phosphate, magnesium silicate, calcium silicate, and iron oxide and mixtures thereof on the structural parts of a system containing [an aqueous medium] *water*, which in turn contains the compounds or ions which would otherwise lead to the formation and deposition of said compound or compounds, which comprises introducing into the [aqueous medium] *water* an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

58. A method of controlling the formation and deposition of at least one compound selected from the group consisting of calcium carbonate, calcium sulfate, calcium phosphate, magnesium phosphate, calcium silicate, magnesium silicate, and iron oxide and mixtures thereof on the structural parts of a steam generating system containing [an aqueous medium] *water,* which in turn contains ions which would otherwise lead to the formation and deposition of said compound or compounds, which comprises introducing into the [aqueous medium] *water* an effective amount for the purpose of a polymer or the water soluble salt of said polymer, which polymer is comprised of sulfonated styrene moieties and moieties derived from maleic anhydride, the ratio of said styrene moieties to said maleic anhydride derived moieties being from about 2:1 to about 4:1.

60. *A method according to the claim 33, wherein substantially all of the styrene moieties in the polymer are sulfonated.*

61. *A method according to claim 60, wherein the polymer introduced is from about 2.5 to 25 parts per million parts of water in said system.*

62. *A method according to claim 61, wherein the polymer has a molecular weight of about 4,000.*

63. *A method according to claim 62, wherein the polymer possesses a ratio of said styrene moieties to said anhydride derived moieties of about 2:1 to 3:1.*

64. *A method according to claim 63, wherein the water contains calcium cations and phosphate anions in amounts sufficient to make the water prone to forming calcium phosphate scale on said structural parts.*

65. *A method according to claim 57, wherein the system is a cooling system in which the water is the cooling medium, substantially all of the styrene moieties in the polymer are sulfonated, the polymer is introduced in an amount of about 2.5 to 25 parts per million parts of the water, and the polymer has a molecular weight of about 500 to 100,000 and contains a ratio of said styrene moieties to said anhydride derived moieties of about 2:1 to 3:1.*

66. *A method according to claim 65, wherein the polymer has a molecular weight of about 4,000.*

67. *A method according to claim 66, wherein the water contains calcium cations and phosphate anions in amounts sufficient to make the water prone to forming calcium phosphate scale on said structural parts.*

* * * * *